United States Patent [19]

Sikorski et al.

[11] Patent Number: 4,877,376

[45] Date of Patent: Oct. 31, 1989

[54] ATTACHMENT OF A ROTOR BLADE OF FIBER REINFORCED PLASTIC TO A METAL ROTOR HUB

[75] Inventors: Siegfried Sikorski, Munich; Werner Hüther, Karlsfeld, both of Fed. Rep. of Germany

[73] Assignee: Motoren-und Turbinen-Union Munchen GmbH, Munich, Fed. Rep. of Germany

[21] Appl. No.: 202,710

[22] Filed: Jun. 3, 1988

[30] Foreign Application Priority Data

Jun. 4, 1987 [DE] Fed. Rep. of Germany ....... 3718678

[51] Int. Cl.4 .............................................. B64C 11/04
[52] U.S. Cl. .................................... 416/207; 416/209; 416/241 A; 416/248
[58] Field of Search ............... 416/225, 205, 207, 209, 416/241 A, 230 R, 248

[56] References Cited

U.S. PATENT DOCUMENTS

| | | | |
|---|---|---|---|
| 2,919,889 | 1/1960 | Rubel | 416/225 |
| 3,487,879 | 1/1970 | McCarthy et al. | 416/205 |
| 3,694,104 | 9/1972 | Erwin | 416/241 A |
| 3,720,481 | 3/1973 | Motta | 416/207 X |
| 3,737,250 | 6/1973 | Pilpel et al. | 416/241 A X |
| 4,007,998 | 2/1977 | Blasiole et al. | 416/248 X |
| 4,012,171 | 3/1977 | Suvak | 416/209 X |
| 4,031,601 | 6/1977 | Staub et al. | 416/248 X |
| 4,047,840 | 9/1977 | Ravenhall et al. | 416/220 R X |
| 4,098,559 | 7/1978 | Price | 416/241 A |
| 4,110,056 | 8/1978 | Stevenson | 416/248 X |

FOREIGN PATENT DOCUMENTS

| | | | |
|---|---|---|---|
| 872816 | 4/1953 | Fed. Rep. of Germany | 416/207 |
| 1503480 | 7/1970 | Fed. Rep. of Germany | 416/241 A |
| 2323908 | 4/1977 | France | 416/207 |
| 646067 | 2/1979 | U.S.S.R. | 416/225 |
| 742256 | 7/1980 | U.S.S.R. | 416/207 |
| 1166700 | 10/1969 | United Kingdom | 416/241 A |

Primary Examiner—Everette A. Powell, Jr.
Attorney, Agent, or Firm—Roberts, Spiecens & Cohen

[57] ABSTRACT

A fiber reinforced thermoplastic propeller is attached to a metallic rotor by an integral shank at the base of the propeller. By virtue of the manufacture of the shank and the propeller as an integral construction, improved transmission of centrifugal forces especially where the propeller and hub have greatly different cross-sections can be effected while simultaneously reducing weight. Attachment of the shank to the hub is made through a connection by which pre-stress can be applied to the propeller to assist in resistance of lateral impact force.

15 Claims, 3 Drawing Sheets

ATTACHMENT OF A ROTOR BLADE OF FIBER REINFORCED PLASTIC TO A METAL ROTOR HUB

FIELD OF THE INVENTION

This invention relates to a rotor blade of a turbine engine and particularly to means for attaching the rotor blade to a rotor hub which enables the rotor blade to be constituted in its attachment region of a shank integral with the blade and made of a reinforced synthetic resin material.

PRIOR ART

Efforts are being made in turbine engine construction to improve engine performance and simultaneously improve the economy of the engine. For the latter purpose, attempts have been made to minimize engine weight by the use of high-strength light-metal alloys or increasingly of fiber materials. The latter suggest themselves for use in the thermally unstressed first stage of the engine, which in modern bypass engines is the fan or propfan stages.

Such blades made of fiber materials, however, must be attached to a metallic hub coupled to the turbine rotor, and at present this is achieved by bolts or rivets, to resist centrifugal forces, aerodynamic loads, and loads produced by impact on the blade by a foreign body.

An attaching arrangement of this type is disclosed in AT-PS 249 847. This type of attachment assumes that the cross-sections of the fiber blade and the metallic hub substantially correspond. For propfan blades, aerodynamic considerations make it desirable for the cross-section of the metallic hub to be substantially smaller than that of the blade profile. With the known types of attachment, however, this leads to production of excessive stresses by large bending moments in the fiber material in the vicinity of the blade root, especially under foreign body impact, so that the risk of blade fracture is present.

Known from DE-PS 672 645 and DE-PS 28 32 098 are attaching arrangements in which tiebolts are provided in the interior of the airfoil, which leads to a more favorable transmission of stress. These attaching arrangements, however, have the disadvantages of great weight, and at the joint between the blade and the tiebolt severe stresses in the fiber material are produced.

SUMMARY OF THE INVENTION

An object of the present invention is to provide an attaching means for a blade of fiber material, more particularly for a propeller of a propfan to a metallic hub which will satisfy the requirements of substantially different cross-sections of the two components and achieve a favorable transfer of the forces caused by centrifugal effect and impact from foreign bodies while reducing the weight.

In accordance with the invention, the blade is formed with an integral shank and the hub comprises a metal body having a bore receiving the shank and tensioning means connects the shank and the body for applying tensile force to the shank, the blade and its shank being integrally formed of a fiber-reinforced synthetic resin material.

The construction of the invention permits the manufacture of the assembly to be advantageously simplified and the weight to be reduced while providing a consistently high rate of force transfer. In the manufacture of the blade, the shank thereof is advantageously formed by a bundle of longitudinal fibers.

The blade is preferably connected to a flange on the metal body by means of bolts or screws. In this manner, the blade is doubly connected to the metal body. The aerodynamic centrifugal loads are resisted more advantageously and with less stress in the material. Bending moments, torsional moments and transverse forces are all transferred to the metal body mainly through the retaining connections which ensure tight and positive engagement between the propeller and the hub, while the longitudinal forces (centrifugal forces) are mainly transmitted through the shank to the metal body.

In a preferred embodiment of the present invention, the tensioning means comprises a tension bolt rotatably arranged in a transverse bore in the shank and at either end the tension bolt has an eccentric pivot pin carried in the metal body. In this arrangement, each pivot pin is preferably arranged in a support disc slidably mounted within a circumferential slot in the metal body. In this arrangement, the support discs enable assembly of the attaching means.

When the tension bolt is rotated via a head on one of the pivot pins, tension is applied to the shank. In the process the slots allow circumferential travel of the pivot pins while the tension bolt travels axially within the shank.

In an alternative embodiment of the tensioning means, the tensioning means comprises a tension bolt securing the shank of the blade to a tension sleeve. The tension sleeve has a cam surface at one of its ends formed by two spirally ascending semi-annular faces bearing against inversely formed corresponding cam surfaces of a coaxially arranged rotary sleeve which abuts against an annular flange on the metal body. The metal body preferably has one or more circumferential slots providing access to the rotary sleeve which in turn has blind holes which can be engaged by a tool to rotate the rotary sleeve and vary the tension applied to the shank. This permits the tension on the blade to be safely and simply applied, and simple locking provisions on the rotary sleeve can keep the tension from slackening in operation.

In a further alternative embodiment of the present invention, the shank is formed of U-shape and an eccentric tensioning means is provided within the shank to bear against the bend of the U. This provides the advantage that the pre-tensioning force is transmitted favorably and the fibers in the shank are continous. This permits better utilization of the material properties.

DETAILED DESCRIPTION OF PREFERRED EMBODIMENTS

Figure 1:
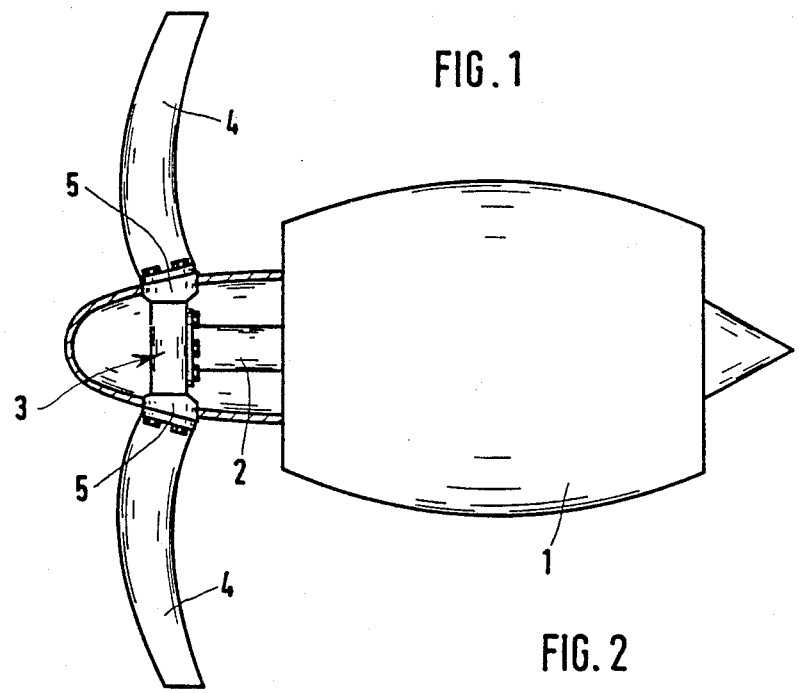
FIG. 1 is an elevation view, on enlarged scale, showing the attachment of the rotor blade to the rotor hub.

With reference to FIG. 1, therein is seen a propfan turbine engine which comprises a gas turbine 1 shown in diagrammatic outline having a shaft 2 to which is attached a propfan rotor 3. Secured to a hub of the rotor are circumferentially spaced rotor blades 4 in the form of propellers. The blades 4 are attached to the rotor 3 by attachment means 5 which will be described hereafter with reference to respective embodiments 5b, 5c and 5d in FIGS. 2, 4 and 6. The blade 4 is formed of a synthetic resin material i.e. thermoplastic or thermosetting reinforced by fibers of carbon, glass, aromatic polyamides or combinations thereof. In a particular embodiment, the fibers are carbon embedded in an epoxide or polyimide resin matrix. The material of the blades is known. The hub of the rotor 3 is made of a high strength metal, such as titanium.

Figure 2:
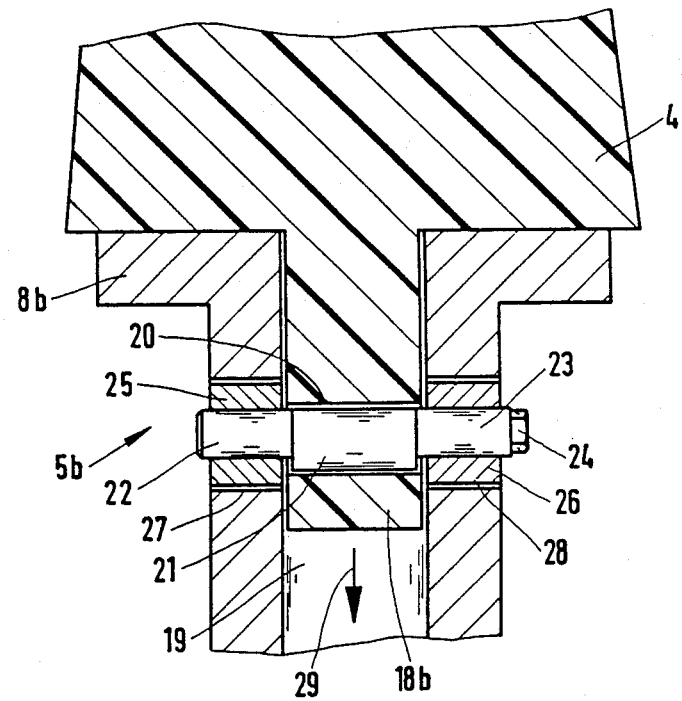
FIG. 2 is a sectional view, on enlarged scale, showing the attachment of the rotor blade to the rotor hub.

Referring to FIG. 2, the blade 4 is formed with an integral tubular shank 18b engaged in a tubular bore 19 in a tubular body 8b which forms the hub of the rotor. The shank 18b, bore 19 and tubular body 8b are all cylindrical and coaxial.

Figure 3:
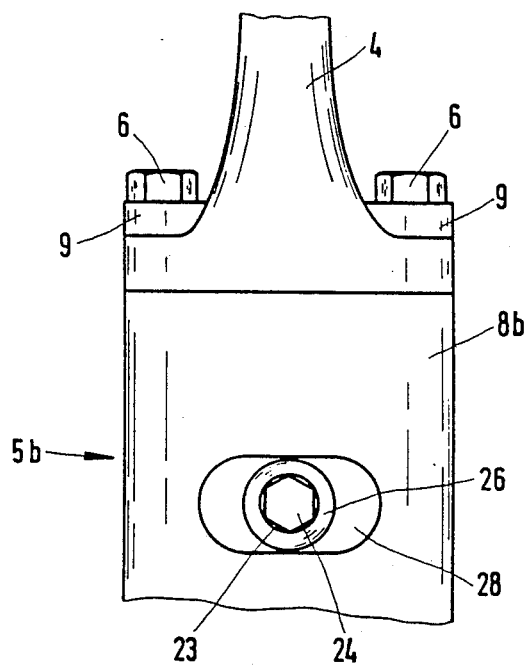
FIG. 3 is a side elevational view of the attachment in FIG. 2.

The attachment means 5b in FIGS. 2 and 3 comprises tension bolt 21 engaged in a transverse bore 20 in the shank 18 and bolt 21 is fitted with diametrically opposed eccentric pivot pins 22, 23 at its two ends. Pivot pin 23 has a hexagonal torquing head 24 which, when turned with a suitable tool, applies tension to the tension bolt 21. The pivot pins 22, 23 are carried in two support discs 25, 26 which in turn are slidably arranged in circumferential slots 27, 28. When the tension bolt 21 is turned via torquing head 24, the support discs 25, 26 travel in the slots 27, 28 while the bolt 21 travels axially of shank 18b. In the process, tension is applied to the shank 18 in the direction of arrow 29 to press the blade 4 against an upper flange of tubular body 8b.

As will become apparent from FIG. 3, retaining bolts 6 and a thrust plate 9 are provided to secure the blade root to the tubular body 8b. When the shank 18b extending at the interior of the propeller 4 is tensioned, compressive stress is produced on the outer plies of fiber of the propeller 4 by the annular flange of tubular body 8b which appreciably raises the resistance of the blade 4 against impact by foreign bodies. In other words, a prestress is produced in the blade 4 which opposes stresses developed in the blade due to lateral impact forces.

Figure 4:
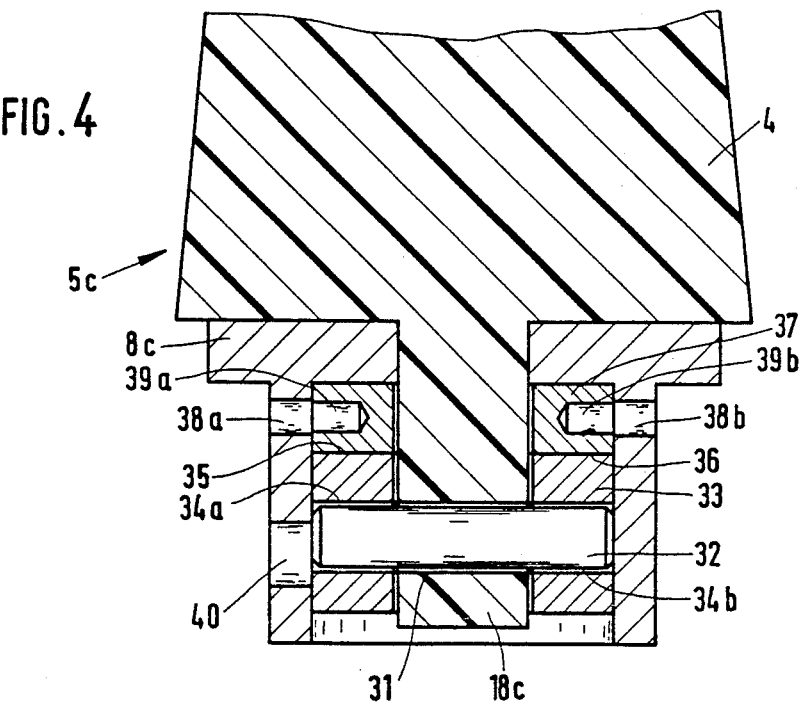
FIG. 4 is a sectional view illustrating a further arrangement of the attachment between the rotor blade and hub.
Figure 5:
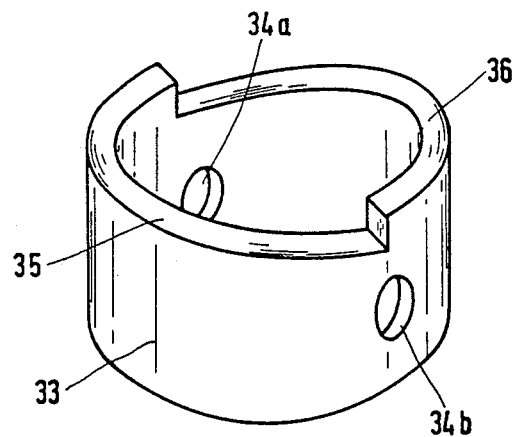
FIG. 5 is a perspective view of a tension sleeve in the embodiment in FIG. 4.

FIG. 4 illustrates an alternative embodiment of the tensioning means 5c, where a retaining pin 32, is arranged in a transverse bore 31 in shank 18c. The retaining pin 32 has end portions received in holes 34a, 34b in a tension sleeve 33 surrounding shank 18c and engaged in tubular body 8c. The tension sleeve 33 has two spirally ascending semi-annular cam faces 35, 36 matched to inversely conforming cam surfaces on a coaxially arranged rotary sleeve 37. The tension sleeve 33 and the rotary sleeve 37 are arranged one above the other for axial displacement in the tubular body 3c, rotary sleeve 37 abutting against the end flange of tubular body 8c. The tubular body 8c has circumferential slots 38a, 38b in angularly spaced regions to permit access to positioning holes 39a, 39b in the rotary sleeve 37. By engaging a tool in the positioning holes 39a, 39b the rotary sleeve 37 can be rotated to tension the shank 18c. For installation of the retaining pin 32, the tubular body 8c has a fitting hole 40.

Figure 6:
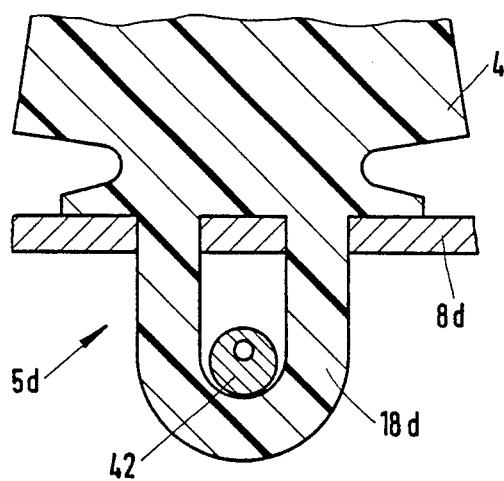
FIG. 6 is a sectional view of another arrangement of the connection between the rotor blade and hub.

FIG. 6 illustrates another embodiment of the tensioning means 5d in which the shank 18d is flat and has a U-shaped cross-section. An eccentric pin 42 is received in the shank 18d and bears against the bend of the shank. When the eccentric pin 42 is rotated, blade 4 is pulled towards hub 8d. Installation of the U-shaped shank 18 is made through an insertion (not shown) in the hub. In transverse section, the embodiment of FIG. 6 appears substantially the same as that in FIG. 2.

Although the invention has been described in relation to specific embodiments, it will become apparent to those skilled in the art that numerous modifications and variations can be made within the scope and spirit of the invention as defined in the attached claims.

What is claimed is:

1. Apparatus for attaching a rotor blade of a turbine to a rotor hub of the turbine, said apparatus comprising a shank extending axially on a rotor blade of a turbine, a tubular, metal body constituting part of a hub of the turbine, said metal body having a bore receiving said shank, and tensioning means connecting said shank and said tubular body for applying tensile force to said shank, said shank being integrally formed with the blade of a fiber reinforced synthetic resin material, said tensioning means comprising a tension bolt received in a transverse opening provided in said shank, means on said tension bolt projecting laterally of said shank, and turnable means accessible from outside said metal body and engaging said metal body and said means which projects laterally of said shank for applying adjustable tensile force to said shank via said tension bolt by turning said turnable means from outside said metal body.

2. Apparatus as claimed in claim 1 wherein said metal body includes a flange against which said blade abuts, said apparatus further comprising attachment means between said blade and said flange.

3. An apparatus as claimed in claim 2 wherein said attachment means applies compressive forces between said blade and said flange.

4. Apparatus as claimed in claim 1 wherein said metal body has a circumferential slot therein, said tensioning means further comprising a support disc slidably supported in said circumferential slot, said pivot pin being mounted in said disc.

5. Apparatus as claimed in claim 4 wherein said tensioning means further comprises a second eccentric pivot pin aligned with the first said pin and extending from the bolt in diametric opposition to said first pin, said metal body having a second annular slot in which is slidably supported a second support disc in which said second pin is mounted.

6. Apparatus as claimed in claim 1 wherein said bore in said metal body is cylindrical and said shank is corespondingly cylindrical.

7. An apparatus as claimed in claim 1 wherein said means on the tension bolt which projects laterally of said shank comprises an eccentric pivot pin rotatably supported in said metal body.

8. Apparatus as claimed in claim 1 wherein said turnable means comprises a tension sleeve in said tubular body surrounding said shank and receiving the means on the tension bolt which projects laterally of said shank, a rotary sleeve arranged in said tubular body for rotation on said tension sleeve and cam means between said rotary sleeve and said tension sleeve for axially displacing said tension sleeve and said tension bolt and shank therewith as said rotary sleeve is rotated.

9. Apparatus as claimed in claim 8 wherein said tubular body has a circumferential slot providing access to said rotary sleeve to permit rotation of said rotary sleeve from outside said metal body.

10. Apparatus as claimed in claim 9 wherein said rotary sleeve has a hole for application of a force to rotate the rotary sleeve.

11. Apparatus as claimed in claim 10 wherein said cam means comprises inverse cam surfaces on said rotary sleeve and said tension sleeve.

12. Apparatus as claimed in claim 11 wherein each of said cam surfaces includes two spirally ascending semi-annular faces.

13. Apparatus as claimed in claim 8 wherein said tension sleeve and said rotary sleeve define a coaxial tubular opening, said shank being tubular in correspondence with said tubular opening and engaging therein.

14. Apparatus as claimed in claim 1 wherein said turnable means is rotatably adjustable to apply tension force to the blade between 0.5 and 10 times the maximum centrifugal force applied to the blade.

15. Apparatus as claimed in claim 1 wherein said shank has a U-shape and includes a bend region, said tension bolt engaging said shank at said bend region, said means on said tension bolt which projects laterally of said shank including an eccentric pin rotatably supported in said metal body.

* * * * *